United States Patent
Kurmala et al.

(10) Patent No.: US 11,336,563 B1
(45) Date of Patent: May 17, 2022

(54) ROUTING SUBNETS OF BRANCH GATEWAYS IN A GEOGRAPHIC REGION TO A SELECTED HEADEND GATEWAY

(71) Applicant: HEWLETT PACKARD ENTERPRISE DEVELOPMENT LP, Houston, TX (US)

(72) Inventors: Hari Krishna Kurmala, Santa Clara, CA (US); Shreekanth Chandranna, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/242,524

(22) Filed: Apr. 28, 2021

(51) Int. Cl.
*H04L 45/24* (2022.01)
*H04L 101/622* (2022.01)
*H04L 45/12* (2022.01)
*H04L 45/741* (2022.01)
*H04L 101/668* (2022.01)
*H04L 61/5061* (2022.01)

(52) U.S. Cl.
CPC ............ *H04L 45/24* (2013.01); *H04L 45/123* (2013.01); *H04L 45/741* (2013.01); *H04L 61/2061* (2013.01); *H04L 61/6022* (2013.01); *H04L 61/6068* (2013.01)

(58) Field of Classification Search
CPC ............. H04L 61/6068; H04L 61/6022; H04L 61/2061; H04L 45/741; H04L 45/123; H04L 45/24
See application file for complete search history.

(56) References Cited

U.S. PATENT DOCUMENTS

| 7,376,743 | B1 | 5/2008 | Bazzinotti et al. |
| 10,673,725 | B2 | 6/2020 | Nambisan et al. |
| 10,805,272 | B2 | 10/2020 | Mayya et al. |
| 2006/0126636 | A1* | 6/2006 | Dooley ............ H04L 29/12283 370/395.3 |

OTHER PUBLICATIONS

Juniper Networks, "Dynamic VPNs with Pulse Secure Clients," Sep. 28, 2020, https://www.juniper.net/documentation/en_US/junos/topics/topic-map/security-dynamnic-vpns-with-pulse-secure-clients.html.
VMWARE, Inc., "Configure Branch to SD-WAN Hubs VPN," Jul. 27, 2020, https://docs.vmware.com/en/VMware-SD-WAN-by-VeloCloud/3.4/VMware-SD-WAN-by-VeloCloud-Administration-Guide/GUID-9FEFAF84-A106-4204-B026-21D4DFAD4D95.html.

* cited by examiner

*Primary Examiner* — Abdulkader M Alriyashi
(74) *Attorney, Agent, or Firm* — Hewlett Packard Enterprise Patent Department

(57) ABSTRACT

Examples relates to a method for selecting headend gateway for routing subnets of branch gateways of a geographic region in a software defined wide area network (SD-WAN). In some examples, an analyzer issues a subnet to each branch gateway of a first geographic region from a pool of contiguous IP addresses, selects a first set of headend gateways suited to be assigned to the branch gateways, ranks each of the first set of headend gateways based on a parameter that includes dynamic loading of each headend gateway or link health information between each of the headend gateways and the branch gateways, and forwards the information including the ranking of headend gateways of the first set to a network orchestrator of the SD-WAN to cause the network orchestrator to assign the branch gateways to the highest ranking gateway based on information including the ranking of the first set of headend gateways.

18 Claims, 5 Drawing Sheets

ROUTING SUBNETS OF BRANCH GATEWAYS IN A GEOGRAPHIC REGION TO A SELECTED HEADEND GATEWAY

BACKGROUND

A wide area network (WAN) may extend across multiple network sites (e.g., geographical or logical). Network sites of the WAN are interconnected so that devices at one network site (e.g., a branch site) can access resources at another network site (e.g., a core site). In particular, branch sites (e.g., regional offices, retail stores, or the like) connect client devices (e.g., laptops, smartphones, internet of things devices, or the like) to the WAN and core sites (e.g., datacenters or headquarters) connect their services and resources to the WAN. Often, WANs may be implemented using software defined wide area network (SD-WAN) technology. SD-WANs decouples, logically or physically, the control aspects of switching and routing from the physical routing of data traffic within the WANs.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
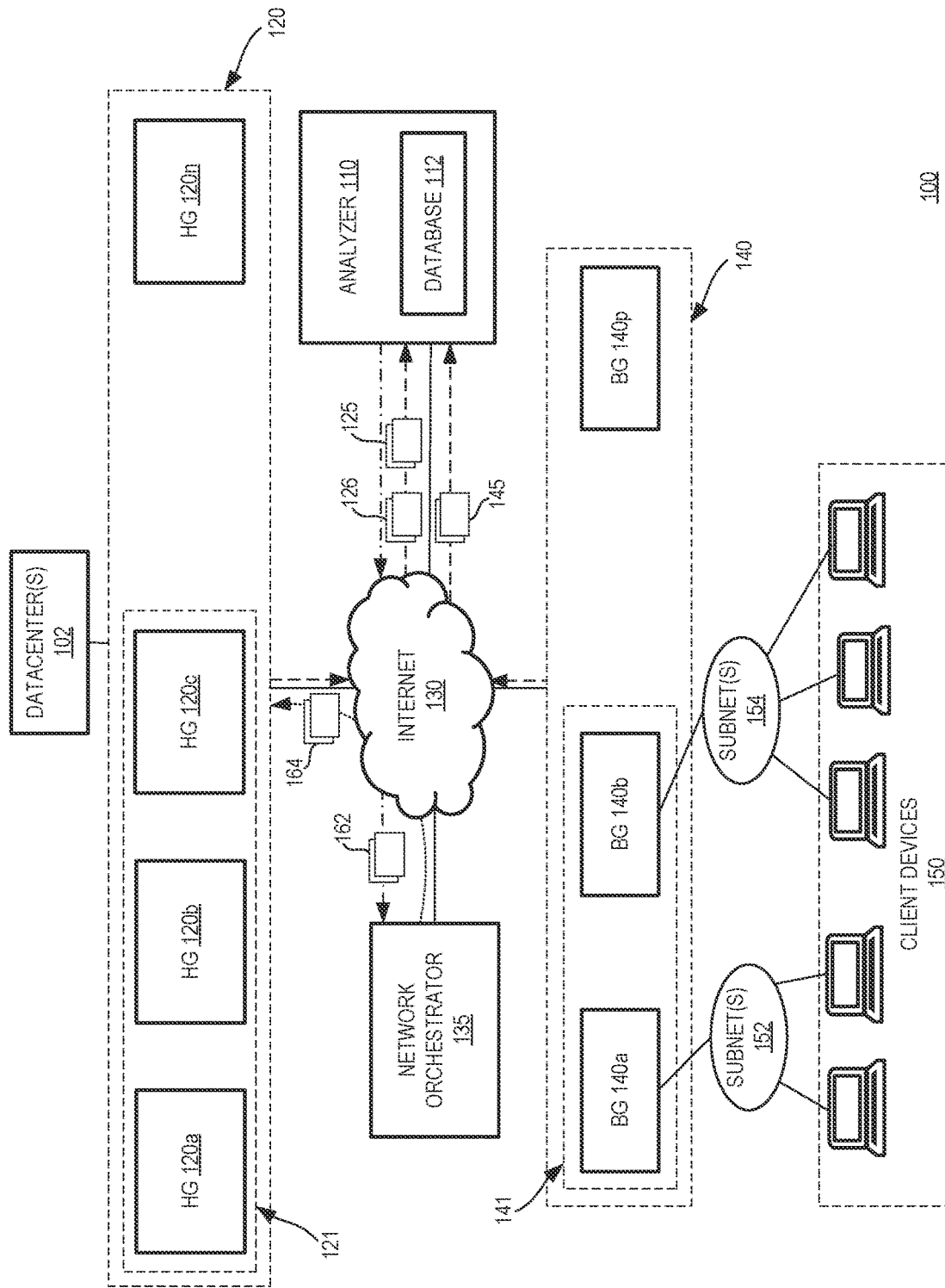
FIG. 1 illustrates a software defined wide area network (SD-WAN) with headend gateway selection to route subnets of branch gateways of a first geographic region, in accordance with one example.

Certain examples have features that are in addition to or in lieu of the features illustrated in the above-referenced figures. Certain labels may be omitted from certain figures for the sake of clarity.

DETAILED DESCRIPTION

In WANs, each network site has its own local area network (LAN) that may connect to another local area network(s) (LAN) of one or more other network sites. Networking infrastructures, such as switches and routers are often used to forward data traffic through each of the LANs, through the WAN as a whole, and between the WAN and the Internet. Each network site's LAN may connect to the WAN through a gateway. For example, branch gateways (BGs) connect the branch sites to the WAN, and headend gateways (HGs) connect the core sites to the WAN.

Branch gateways (BGs) are network infrastructure devices that are placed at the edge of a branch site. Often BGs are routers that interface between LANs of the branch sites and a wider network, whether it be directly to other LANs of the WAN via dedicated network links (e.g., MPLS) or to the other LANs of the WAN via the Internet through links provided by an Internet Service Provider connection. Many BGs can establish multiple uplinks to the WAN, both to multiple other LANs of the branch sites, and also redundant uplinks to a single LAN of other branch sites. BGs also often include network controllers for the LANs of the branch sites. In such examples, a BG in use in a SD-WAN may include a network controller that is logically partitioned from a router included in a branch site.

Headend gateways (HGs, also sometimes referred to as VPN concentrators) are network infrastructure devices that are placed at the edge of a core site. Often HGs are routers that interface between a LAN of the core site and a wider network, whether it be directly to other LANs of the WAN via dedicated network links (e.g., MPLS) or via the Internet through links provided by an Internet Service Provider connection. Many HGs can establish multiple uplinks to the WAN, both to multiple other LANs of the core sites, and also redundant uplinks to a single LAN of other sites. HGs also often include network controllers for the LANs of the core sites. In such examples, a HG in use in a SD-WAN may include a network controller that is logically partitioned from a router included in the core site.

Initialization of an SD-WAN or a site within the SD-WAN generally includes assignment of a gateway (e.g., branch gateway (BG)) in a branch site to a specific gateway (e.g., headend gateway (HG)) in a core site to provide a connection for routing data traffic between the sites. In some SD-WANs, core sites, such as datacenters and headquarters may have multiple HGs around the world that provide access to the respective core sites. A given BG may have multiple candidate HGs that may potentially allow for a fast and stable connections between sites for routing data traffic. It is highly likely that each of the multiple candidate HGs is collocated with the given BG in the same geographic region. For example, a BG in Oakland or Phoenix may have options to connect to one of the HGs located in Los Angeles, Calif.; Seattle, Wash. or Vancouver, Canada. However, in a typical SD-WAN, BGs at different branch sites are randomly assigned to one of their respective candidate HGs at different core sites. It may be possible that a BG in Oakland is connected to a HG located in Los Angeles and a BG located in Phoenix is connected to a HG located in Vancouver.

The assignment of a BG to a HG often includes establishing a connection between the BG and the HG. Once the connection is established, the HG may add a route for each subnet of the BG in a routing table that is maintained by the HG. A subnet is a logical subdivision of an IP network that includes a range of contiguous IP addresses (e.g., IP addresses ranging from 200.100.10.0 to 200.100.10.255) sharing a common IP address component (e.g., an IP address prefix). A route is a path through a network. In particular a route may refer to a path that packets take through the physical underlay network.

As used herein, the term "subnet" may refer to a portion or subdivision of a network that shares a common IP address component (e.g., an IP address prefix). For example, an Internet protocol version 4 (IPv4) network having prefix 200.100.10.0/24, that contains 256 IP addresses ranging from 200.100.10.0 to 200.100.10.255, may be divided into two subnets 200.100.10.0/25 and 200.100.10.128/25, each containing 128 IP addresses. Thus, a subnet includes a subrange of contiguous IP addresses to be allocated to a domain or group as per subnet settings, which defines subranges (i.e., subnets) of IP addresses. A subnet may be characterized by its subnet mask which is a 32 bits address used to distinguish between a network address and a host address in IP address. For example, 255.255.255.0 is the subnet mask for the prefix 200.100.10.0/24.

The term "contiguous IP addresses", as used herein, may refer to IP addresses that are in a sequence, such as IP addresses in a range 200.100.10.0 to 200.100.10.125. A pool of contiguous IP addresses associated with a geographic region may include a plurality of contiguous IP addresses. In an example, a pool of contiguous IP addresses includes a plurality of contiguous IP addresses to be allocated to the client devices associated to BGs of a given geographic region. For example, a pool of contiguous IP addresses may contain 256 IP addresses ranging from 200.100.10.0 to 200.100.10.255. A routing table is a data table stored in a router (e.g., a HG) that lists the routes to a particular destination. For example, each HG includes a routing table to list the routes for the subnets of a BG assigned to the HG. In large networks including hundreds or thousands of subnets, a large number of routes may exist in a routing table. In certain implementations, use of route summarization can reduce the number of routes in the routing table. Route summarization (also referred to as "route aggregation" or "supernetting") may summarize a plurality of routes and advertise a single summarized or aggregated route representing the plurality of routes. Typically, route summarization may be applied to summarize a plurality of routes corresponding to the subnets of a given BG as the subnets of the given BG include contiguous IP addresses. However, it may be challenging to summarize routes corresponding to subnets of two or more BGs at different branch sites assigned to a given HG into a single summary route because the subnets of the two or more BGs may not include contiguous IP addresses. For example, a first BG joining a SD-WAN at a first branch site and a second BG joining the SD-WAN at a second branch site may be assigned to a first HG. However, it may not be possible to summarize the routes corresponding to the subnets of the first BG and the second BG as they do not include contiguous IP addresses. Accordingly, reducing the number of routes in a routing table may be difficult.

The systems and techniques disclosed herein are directed to enabling routing of the subnets of BGs of a first geographic region to a selected HG that provides a fast and stable connection between each branch site (including one of the BGs) and a core site (including the selected HG). The techniques disclosed may help in reducing routes in a routing table by summarizing routes corresponding to the subnets of the BGs of the first geographic region to the selected HG. For example, the subnets of the BGs of the first geographic region are selected from a pool of contiguous IP addresses and then the BGs of the first geographic region are assigned to the selected HG to route the subnets of the BGs to the selected HG. When the BGs of the first geographic region are assigned to the selected HG, route summarization may be implemented to summarize routes corresponding to the subnets of the BGs into a single summarized route. In this manner, a single summarized route can be transmitted for routing multiple subnets of all BGs of the first geographic region as compared to multiple separate routes for the subnets of the BGs when the subnets are assigned in a non-contiguous manner. As a result, the systems and techniques disclosed herein may significantly reduce a number of routes in a routing table.

As used herein, the term "core site" may refer to a network site where many services and resources are installed. In an example, the core site may be a datacenter or headquarter. As used herein, the term "branch site" may refer to a network site that connects client devices to a WAN. In an example, the branch site may be a regional office, retail store, or the like. A client device is a computing device that is operated or accessed by a network user. Client devices include laptop, desktop computers, tablets, phones, PDAs, servers, Internet of Things devices, sensors, etc.

FIG. 1 illustrates an example software defined wide area network (SD-WAN) for improved data routing from branch sites to a selected gateway of a core site. SD-WAN 100 includes an analyzer 110, a plurality of headend gateways (HGs) 120a, 120b, 120c, ... 120n (hereinafter collectively referred to as "HGs 120") at one or more core sites such as datacenter(s) 102 to provide access to their respective datacenter(s), Internet 130, a network orchestrator 135, a plurality of branch gateways (BGs) 140a, 140b, ... 140p (hereinafter collectively referred to as "BGs 140") at branch sites, devices (e.g., client devices 150) at the branch sites associated to BGs 140 of SD-WAN 100. Analyzer 110 collects identifying information including geolocation information relating to branch sites and core sites, identifies BGs collocated in a geographic region, selects HGs suited to be assigned to the BGs and ranks each HG based on a parameter (e.g., dynamic loading of the HG). Network orchestrator 135 manages and maintains the interconnections between sites of SD-WAN 100, including the branch sites controlled by BGs 140 and the core site that hosts a network service at datacenter(s) 102. Analyzer 110 and network orchestrator 135 are hosted as cloud services or as on-premise services.

Analyzer 110 may be a service or an application provided in SD-WAN 100. In certain examples, analyzer 110 may be provided in SD-WAN 100 as a service (aaS). In some examples, analyzer 110 executes on a computing device in datacenter(s) 102 of SD-WAN 100. In some other examples, analyzer 110 executes on a computing device hosted on a network cloud. Analyzer 110 may include a system, device or apparatus that may enable the functionalities of analyzer 110 as described herein. Analyzer 110 may include any combination of hardware and programming to implement the functionalities of analyzer 110 as described herein. In an example, analyzer 110 may be implemented as a program of instructions stored in a non-transitory, computer-readable medium and executed on a processing circuitry that may include one or more processors or one or more dedicated hardware to perform functionalities as described herein. In this context, "processor" refers to a physical device, for example a central processing unit (CPU), semiconductor-based microprocessor, application-specific integrated circuit (ASIC), graphics processing unit (GPU), a field-programmable gate array (FPGA), a microcontroller device, a digital signal processor (DSP), other hardware devices capable of executing instructions stored in the computer-readable medium. In some examples, the processing circuitry may include at least one integrated circuit (IC), control logic, electronic circuits, or combinations thereof that include a number of electronic components for performing the functionalities intended to be performed by analyzer 110.

Network orchestrator is a service (e.g., instructions stored in a non-transitory, computer-readable medium and executed by a processing circuitry) executed on a computing device that manages switching and routing across a SD-WAN. In some examples, the network orchestrator 135 executes on a computing device in a core site of the SD-WAN 100. In some other examples, the network orchestrator 135 executes on a computing device hosted in a network cloud. The network orchestrator 135 may be provided to the SD-WAN 100 as a service (aaS).

There are many methods for initializing sites on SD-WAN 100, but for the purposes of this disclosure, different methods are contemplated and do not alter the features of this disclosure. An example method is described merely to provide context, but this disclosure is not limited to this specific example initialization method.

Analyzer 110 may be notified by an initialization service when a BG 140 joins the SD-WAN 100. As an example, an organization may purchase a given BG (e.g., BG 140a) from a manufacturer. The manufacture may then associate a device serial number and media access control (MAC) address of BG 140a with the organization. Upon initialization, BG 140a connects to the initialization service using a Uniform Resource Locator (URL) programmed into BG 140a and forwards identifying information 145. The initialization service is associated with analyzer 110 and network orchestrator 135. Due to the dynamic nature of cloud hosted services, the initialization service may execute on the same physical device as analyzer 110, the same physical device as network orchestrator 135, or on a different physical device than analyzer 110 and network orchestrator 135. Irrespective of the physical topology of cloud services, the initialization service may communicate with analyzer 110 and network orchestrator 135.

In an example, analyzer 110 may receive a notification including identifying information 145 from the BG 140. Similarly, if a HG 120 joins the SD-WAN 100, analyzer 110 receives another notification including identifying information 125 from the HG 120. The identifying information 125 and 145 may include information such as a device serial number, component serial number, public Internet Protocol (IP) address, media access control (MAC) address, device type, device software version, etc.

Based on initialization policies configured by a network administrator, BG 140a is identified. Analyzer 110 receives identifying information 145 from BG 140a. Identifying information 145 may include information such as a device serial number, component serial number, IP address, MAC address, device type, device software version, etc. From the received identifying information 145, analyzer 110 can determine geolocation information of BG 140a. The geolocation information may include a geographic location that can be determined in one of many ways. For example, the geographic location may be determined by transmitting identifying information 145 to a location determination service or by looking up the IP address in a geographic database, etc. The geographic location may take one of many forms, including but not limited to, nearest metropolitan area, latitude and longitude, legal jurisdiction, etc. The geolocation information may also include a geographic region, such as a continental region (e.g., North America) or a subdivision of a continental region (e.g., Western North America). The geographic region may, in some examples, be provided by the location determination service (not shown). In some other examples, the geographic region of BG 140a may be determined by analyzer 110 using the received geographic location. Analyzer 110 then stores the geolocation information including the geographic location and the geographic region of BG 140a in a database 112.

In some examples, analyzer 110 receives identifying information 145 from each BG 140 joining SD-WAN 100, determines its geolocation information and stores the geolocation information in database 112. Based on the geolocation information, analyzer 110 may identify that BG 140a and BG 140b belong to the same geographic region (e.g., a first geographic region such as a western North Asia region). Although FIG. 1 shows two BGs 140a and 140b (hereinafter collectively referred to as "BGs 141") in the first geographic region, more than two BGs may belong to the first geographic region. Further, SD-WAN 100 may include different geographic regions each including multiple BGs.

Similarly when a HG (e.g., HG 120a) is added to SD-WAN 100, geolocation information may be determined for HG 120a, as well. Analyzer 110 receives identifying information 125 from HG 120a. Similar to the methods described in relation to BG 140a, analyzer 110 determines geolocation information including a geographic location and a geographic region of HG 120a and stores the geolocation information in database 112. In some examples, analyzer 110 receives identifying information 125 from each HG 120 joining SD-WAN 100, determines its geolocation information and stores the geolocation information in database 112. In an example, HG 120a may be in a western North Asia region and HG 120n may be in an East America region.

In addition, analyzer 110 may receive performance information 126 from each HG 120 and store the performance information in database 112. For example, each HG 120 may send its performance information to the analyzer, including its usage of a processing resource (e.g., CPU, ASIC, GPU, FPGA or the like), usage of a memory, per-application metrics, network interface capacity, network interface load etc. In some examples, each HG 120 periodically sends its performance information 126 to analyzer 110. Further, analyzer 110 may receive link health information for one or more links that transceive data traffic between a given BG 141 and a HG 120 from the BG 141.

As used herein, the term "link health information" may include information (e.g., a value) representing health of a link between a given BG and a given HG based on network parameters of the link. Examples of the network parameters may include jitter, latency, packet-loss, throughput or bandwidth. In some examples, the link health information may include the network parameters of the link. The given BG may periodically determine the network parameters of the link in order to gauge health of the link to ensure quality of service (QoS) and maintain uninterrupted service. In an example, the given BG may send probes, such as Internet Control Message Protocol (ICMP) probes to the given HG and collect the network parameters for the link. In an example, if the network parameters such as latency, jitter, and packet loss for a first link between the given BG and the given HG are lower than the network parameters for a second link between the given BG and the HG, the first link may be healthier than the second link.

Once BGs 141 in the first geographic region are identified, analyzer 110 may issue one or more subnets selected from a pool of contiguous IP addresses associated with the first geographic region to each of BGs 141. The pool of contiguous IP addresses associated with the first geographic region may include a plurality of IP addresses in a contiguous manner to be assigned to the client devices associated with BGs 141 of the first geographic region. Analyzer 110 is preconfigured to manage subnet settings from the pool of contiguous IP addresses associated with the first geographic region to BGs 141. The subnet setting defines subranges (i.e., subnets) of IP addresses from the pool of contiguous IP addresses to be allocated to client devices 150 in the first geographic region. In an example, analyzer 110 issues one or more subnets 152 to BG 140a and one or more subnets 154 to BG 140b. Each of subnet(s) 152 and subnet(s) 154 is selected from the pool of contiguous IP addresses. As the subnet(s) 152 and subnet(s) 154 are selected from the pool of contiguous IP addresses associated with the first geographic region, the subnet(s) 152 and subnet(s) 154 include contiguous IP addresses, and may be referred to as contiguous subnets. In some examples, analyzer 110 is preconfigured to manage subnet settings for multiple geographic regions from their respective pools of contiguous IP addresses.

When a given client device 150 attempts to connect to one of BG 141, BG 140*a* may assign an IP address to the given client devices 150 from the IP addresses included in subnet(s) 152 or subnet(s) 154 issued to that BG 141 by analyzer 110 as defined in the subnet settings. In some examples, each BG 141 assigns an IP address to each of client devices 150 associated with that BG 141 from respective subnet(s) 152 or subnet(s) 154 issued to that BG 141. In some examples, each BG 141 may have the responsibility of being a dynamic host configuration protocol (DHCP) server. The DHCP is a network management protocol which provides an automated assignment of IP addresses so they can communicate efficiently with other endpoints. The DHCP server can manage IP settings for client devices on its local network by assigning, automatically and dynamically, IP addresses to the client devices. In some examples, a network infrastructure device (e.g., a router or a gateway) within the network or a cloud device connected to the network may be enabled to act as the DHCP server. For example, a separate DHCP server may exist on a cloud device or elsewhere on SD-WAN 100.

In some examples, when analyzer 110 receives a notification that a new BG 140 has joined SD-WAN 100 in the first geographic region, analyzer 110 re-issues a subnet to each BG 141 of the first geographic region in the similar fashion as previously described.

Once BGs 141 of the first geographic region are identified, analyzer 110 creates a preliminary list of a first set of HGs 121 that are suited to be assigned to BGs 141. A HG may be suited to be assigned to a BG when the HG can provide a fast and stable connection to transceive (i.e., transmit and receive) data traffic between the BG at a branch site and a core site associated to the HG. In an example, the HG may be physically located within a close enough proximity to the BG by virtue of being in the same geographic region that it is potentially be suitable HG to be assigned to the BG. Further, a "most suited" HG may be a HG out of a set of HGs that can provide faster and more stable connection between a BG at a branch site and a core site as compared to the connections provided by any other HG of the set of HGs.

The first set of HGs 121 may be selected based on the geographic location of each of the plurality of HGs 120. Analyzer 110 may identify one or more HGs (e.g., HGs 120*a*, 120*b* and 120*c* (hereinafter collectively referred to as "HGs 121")) from the plurality of HGs 120 that are collocated with BGs 141 in the first geographic region. In an example, if BGs 141 are collocated in the Western North America region, there may be multiple HGs 120 located in the Western North America region that are suitable to be assigned to BGs 141. For example, HG 120*a* located in Denver, Colo., HG 120*b* located in San Jose, Calif. and HG 120*c* located in Los Angeles, Calif. may be suitable to be assigned to BGs 141.

Once the preliminary list of the first set of HGs 121 is generated, analyzer 110 may determine parameters including dynamic loading of each HG 121 or link health information between each BG 141 and each HG 121 for determining suitability of HG 121 to be assigned to BGs 141. In an example, analyzer 110 may determine dynamic loading of each HG 121 and link health information between each HG 121 of the first set and each BG 141 of the first geographic region. As user herein, the term "dynamic loading" may mean that loading of a HG may change with time. For example, loading of a given HG in a SD-WAN may change depending on usage of resources such as processing resource, memory, network interfaces or the like by the HG at a point in time. In an example, the preliminary list of the first set of HGs 121 is forwarded to each BG 141. Each BG 141 may, individually, determine the network parameters such as such as latency, jitter, packet loss, etc. of the link(s) between the BG 141 and each of HGs 121 of the first set. Each BG 141 may then determine the link health information based on the network parameters and forward the link health information to analyzer 110. Analyzer 110 stores the received link health information in database 112. Further, based on received performance information 126 from each of the first set of HGs 121, analyzer 110 may determine additional parameters such as available capacity (based, in part, on dynamic loading and number of active sessions with other BGs) of each HG 121 and expected bandwidth requirements for BGs 141. In an example, analyzer 110 determines available capacity of each HG 121 depending on its current loading at a point in time. For example, if a given HG is 95% loaded of its total capacity, the available capacity of the given HG is 5% of the total capacity. In some examples, analyzer 110 retrieves performance information 126 from database 112 to determine the parameters of each of the first set of HGs 121 at a given point in time. Each parameter may have a corresponding weight depending on the parameter's importance in determining suitability of each HG of the first set of HGs 121 to be assigned to BGs 141 of the first geographic region.

Based on the determined parameters including dynamic loading and/or the link health information, analyzer 110 determines suitability of each HG 121 of the first set to be assigned to BGs 141 and ranks each HG 121 based on its suitability. The analyzer may rank each HG of the first set of HGs based on a parameter including dynamic loading of each HG or link health information between each HG and each BG of the first geographic region. In an example, the analyzer may rank each HG of the first set of HGs based on the parameters including dynamic loading of each HG, available capacity of each HG and link health information between each HG and each BG of the first geographic region. For example, a first HG of the first set of HGs that provides the fastest and the most stable connection, based on the parameters, between each of the BGs and the core site is ranked first. A second HG of the first set of HGs that may provide a connection that is slower and less stable as compared to the connection provided by the first HG, but faster and more stable than the rest of the HGs of the first set is ranked second.

In some examples, it is possible that a HG 121 (e.g., HG 120*a*) of the first set that is geographically far from BGs 141 is more suitable to be assigned to BGs 141 as compared to other HG(s) 121 (e.g., HG 120*b*) that is geographically nearer. In situations where the link health information based on the network parameters such as latency, jitter, packet loss etc. between BGs 141 and HG 120*a* represents healthier link between BGs 141 and HG 120*a* as compared to that of the link health information between BGs 141 and HG 120*b*, HG 120*a* may be more suitable to be assigned to BGs 141 as compared to HG 120*b*. In situations where HG 120*a* has more available capacity than that of HG 120*b*, HG 120*a* may be more capable of handling the bandwidth requirements of client devices 150 associated with BGs 141 than HG 120*b*.

For example, if HG 120*b* has a total throughput capacity of 10 Giga Bytes per second (Gbps) and has 5% available capacity (available capacity of 500 Mbps), it is not well suited for BGs 141 with a 750 Mbps requirement. Whereas, if HG 120*a* has a total throughput capacity of 1 Gbps and has 95% available capacity (available capacity of 950 Mbps), it may be more suited for BGs 141 with 750 Mbps requirement. In this scenario, HG 120*a* is ranked first and HG 120*b* may be ranked second. In some other examples, analyzer 110 may take the available capacity of each HG 121 into account in selecting a suitable HG for BGs 141 without receiving an expected bandwidth demand from BGs 141. In some examples, when analyzer 110 identifies that a new HG has joined SD-WAN 100 in the first geographic region, analyzer 110 may re-rank HGs 121 of the first set based on parameters including dynamic loading of each HG 121 and link heath information between each BG 141 and each HG 121.

Once each HG 121 of the first set is ranked, analyzer 110 forwards information 162 including the ranking of HGs 121 of the first set to network orchestrator 135. In response to receiving information 162, network orchestrator 135 may select a HG 121 that is ranked first (hereinafter referred to as the highest ranking HG) from the first set and assign BGs 141 to the selected HG 121. Network orchestrator 135 may then establish a connection (e.g., IPsec tunnel) to enable routing of subnet(s) 152 and subnet(s) 154 of BGs 141 to the selected HG 121. In an example, network orchestrator 135 forwards information 164 related to subnet(s) 152 and subnet(s) 154 of BGs 141 (that has been received, by network orchestrator 135, from each BG 141) to the selected HG 121.

Once the selected HG (e.g., HG 120*a*) receives information 164 from network orchestrator 135, HG 120*a* may add a route for each of the subnet(s) 152 and subnet(s) 154 in a routing table. As subnet(s) 152 and subnet(s) 154 include contiguous IP addresses, HG 120*a* may then implement route summarization to represent routes (i.e., contiguous routes) corresponding to contiguous subnet(s) 152 and subnet(s) 154 in a single summarized route (referred to as a first primary summarized route hereinafter). Route summarization is a feature of representing a plurality of contiguous routes in a single aggregated address (also referred to as summarized route). Instead of advertising individual contiguous routes, the route summarization feature advertises a single summarized route representing all contiguous routes. The route summarization thus reduces routing updates and a number of routes in a routing table, and thereby helps in reducing memory requirements and saving some bandwidth. As an example, a routing table of a router includes four routes 172.16.12.0/24, 172.16.13.0/24, 172.16.14.0/24 and 172.16.15.0/24 corresponding to four contiguous subnets. As the route summarization feature is enabled, it advertises a single summarized route 172.16.12.0/22 that represents the four routes 172.16.12.0/24, 172.16.13.0/24, 172.16.14.0/24 and 172.16.15.0/24 and adds the single summarized route 172.16.12.0/22 to the routing table of the router. The router may transmit the single summarized route to an upstream router. The single summarized route may then be used by the router to route the four subnets to the upstream router.

As used herein, the term 'primary summarized route' refers to a single summarized route that is transmitted to route the subnets of BGs of a geographic region by a suitable HG (e.g., a selected HG) located in the same geographic region to a core site (e.g., a datacenter) which the HG is associated to.

Once the route summarization is implemented, HG 120*a* may use the first primary summarized route to route subnet(s) 152 and subnet(s) 154 of BGs 141 of the first geographic region to datacenter(s) 102. In an example, HG 120*a* may transmit the first primary summarized route to a network infrastructure device (e.g., a router) of datacenter(s) 102. The transmission of the first primary summarized route by HG 120*a* may enable BGs 141 to transceive data traffic of associated client devices 150 to datacenter(s) 102.

BGs 141 of the first geographic region may be assigned to the most suitable HG 120*a* (i.e., the highest ranking HG) at a point in time. Changing network conditions, for example, dynamic loading of HGs 121, addition of more HGs 120 and more BGs 140 etc. may cause the assigned HG 120*a* to no longer be the most suitable HG for BGs 141. In some examples, analyzer 110 may periodically survey SD-WAN 100 to determine whether reassigning BGs 141 (that may include a new BG, in some examples) of the first geographic region to another HG will improve overall SD-WAN performance. For example, analyzer 110 may periodically determine parameters (e.g., the dynamic loading of each HG 121 and link health information between each BG 141 of the first geographic region and each HG 121) for each HG 121 of the first set. Based on the parameters, analyzer 110 may re-rank each HG 121 of the first set and forward information pertaining to the re-ranking of the first set of HGs 121 to network orchestrator 135. If another HG 121 (i.e., other than HG 120*a*) is ranked to be at the first place in the first set of HGs 121, network orchestrator 135 may reassign BGs 141 to the other HG 121 and forward the information related to subnet(s) 152 and subnet(s) 154 to the other HG 121.

In some examples, analyzer 110 may identify whether any new BG or HG joins SD-WAN 100 in the first geographic region. Analyzer 110 may dynamically issue a subnet to each BG 141 of the first geographic region when a new BG joins SD-Wan 100 in the first geographic region. As used herein, dynamically issuing may refer to re-issuing a subnet to each BG 141 in response to receiving a notification that a new BG joins SD-WAN 100 in the first geographic region. In an example, analyzer 110 may dynamically select a first set of HGs 121 when a new HG or a new BG joins SD-WAN 100 in the first geographic region. As used herein, dynamically selecting may refer to re-selecting a first set of HGs 121 in response to receiving a notification that a new HG or a new BG joins SD-WAN 100 that may be suitable to be assigned to BGs 141 of the first geographic region. In such examples, analyzer 141 may dynamically rank each HG 121 of the first set based on the parameters including dynamic loading of each HG 121 and link health information between each BG 141 and each HG 121. As used herein, dynamically ranking may refer to re-ranking each HG 121 of the first set based on the parameters. Analyzer 110 may then forward information including re-ranking of the HGs 121 of the first set to network orchestrator 135.

Figure 2:
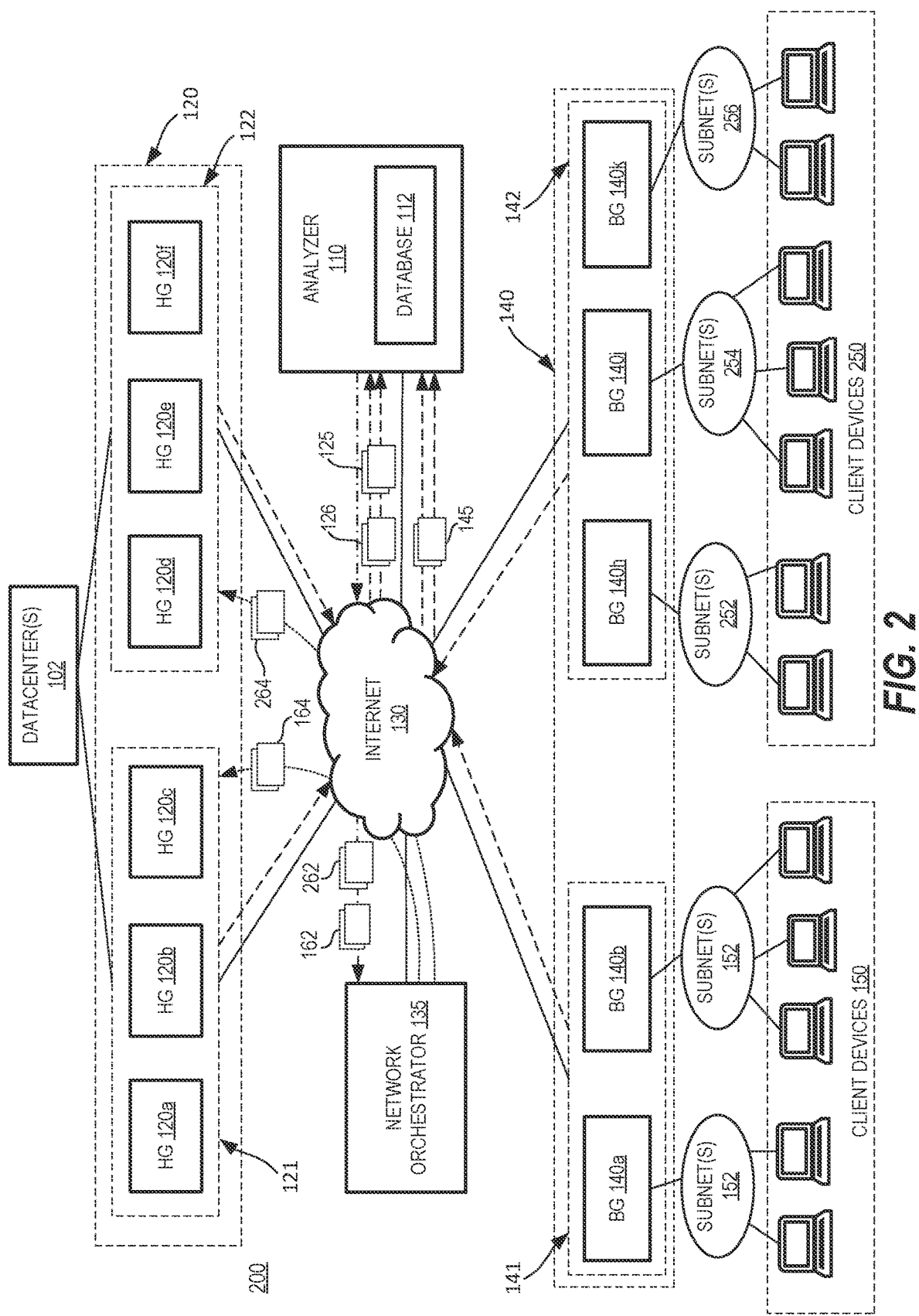
FIG. 2 illustrates an SD-WAN with routing subnets of branch gateways of a first geographic region to branch gateways of a second geographic region, in accordance with one example.

FIG. 2 illustrates SD-WAN 200 in accordance with another example. In comparison to FIG. 1, SD-WAN 200 in FIG. 2 shows BGs of a second geographic region in addition to BGs 141 and describes routing of data traffic between the first geographic region and the second geographic region. Similar to as described with reference to BGs 141 in FIG. 1, analyzer 110 may identify that BG 140*h*, BG 140*i* and BG 140*k* (hereinafter collectively referred to as "BGs 142") belong to the second geographic region based on identifying information 145 received from the respective BGs 142. Once analyzer 110 identifies BGs 142, analyzer 110 issues one or more subnets 252, 254 and 256 to each BG 142 of the second geographic region from another pool of contiguous IP addresses associated with the second geographic region. Analyzer 110 then selects, based on the geolocation information of the plurality of HGs 120, a second set of HGs 122 (e.g., including 120d, 120e and 120f (hereinafter collectively referred to as "HGs 122")) that are suitable to be assigned to BGs 142. In an example, each HG 122 of the second set is collocated in the second geographic region. Analyzer 110 then ranks each HG 122 of the second set based on parameters including dynamic loading of each HG 122 and link health information between each BG 142 and each HG 122 and forwards information 262 including the ranking of HGs 122 of the second set to network orchestrator 135. In response to receiving the information from analyzer 110, network orchestrator 135 selects the highest ranking HG (e.g., HG 120f) of the second set of HGs 122 and assigns BGs 142 to the selected HG 120f. In an example, network orchestrator 135 establishes a connection to enable routing of subnet(s) 252, subnet(s) 254 and subnet(s) 256 of BGs 142 to the selected HG 120f. Network orchestrator 135 also sends information 264 related to subnet(s) 252, subnet(s) 254 and subnet(s) 256 to the selected HG 120f. Once BGs 142 are assigned to the selected HG 120f, and HG 120f receives information 264, HG 120f may implement route summarization to represent routes corresponding to contiguous subnet(s) 252, subnet(s) 254 and subnet(s) 256 in a single summarized route (referred to as a second primary summarized route) in a similar fashion as described above with respect to the first primary summarized route. HG 120f may use the second primary summarized route to route subnet(s) 252, subnet(s) 254 and subnet(s) 256 of BGs 142 of the second geographic region to datacenter(s) 102. In an example, HG 120f may transmit the second primary summarized route to another network infrastructure device of datacenter(s) 102. In this manner, the transmission of the second primary summarized route by HG 120f may enable BGs 142 to transceive data traffic of associated client devices 150 to datacenter(s) 102.

In some examples, network orchestrator 135 may establish a connection to route subnet(s) 152 and subnet(s) 154 of BGs 141 to the selected HG 122 of the second set. Network orchestrator 135 may receive information related to the routes corresponding to subnet(s) 152 and subnet(s) 154 of BGs 141 from the selected HG 121 and store the information to a routing database (nor shown) included in network orchestrator 135. Similarly, network orchestrator 135 may receive information related to the routes corresponding to subnet(s) 252, subnet(s) 254 and subnet(s) 256 of BGs 142 from the selected HG 122 and store in the routing database. In some examples, once network orchestrator 135 establishes the connection, network orchestrator 135 may implement route summarization to represent the routes corresponding to subnet(s) 152 and subnet(s) 154 into a single summarized route (referred to as a first secondary summarized route) and transmit the first secondary summarized route to the selected HG 122 (e.g., HG 120f) of the second set. As used herein, the term 'secondary summarized route', refers to a summarized route that is transmitted to route the subnets of BGs of a geographic region through a suitable HG (e.g., a selected HG) located in another geographic region to BGs located in the other geographic region. As HG 120f of the second set receives the first secondary summarized route, HG 120f may use the first secondary summarized route to route subnet(s) 152 and subnet(s) 154 of BGs 141 to the second geographic region. In an example, HG 120f may transmit the first secondary summarized route to a network infrastructure device in the second geographic region. The transmission of the first secondary summarized route to the network infrastructure device in the second geographic region may enable BGs 141 to transceive data traffic of the associated client devices 150 of BGs 141 with BGs 142 via HG 120f.

In some examples, network orchestrator 135 may establish another connection to route subnet(s) 252, subnet(s) 254 and subnet(s) 256 of BGs 142 to the selected HG 121 of the first set. Once network orchestrator 135 establishes the other connection, network orchestrator 135 may implement route summarization to summarize the routes corresponding to subnet(s) 252, subnet(s) 254 and subnet(s) 256 of BGs 142 into a single summarized route (referred to as a second secondary summarized route) and transmit the second secondary summarized route to the selected HG 121 (e.g., HG 120a) of the first set. HG 120a may then use the first secondary summarized route to route subnet(s) 252, subnet(s) 254 and subnet(s) 256 to the first geographic region. In an example, HG 120a may transmit the second secondary summarized route to a network infrastructure device in the first geographic region. The transmission of the second secondary summarized route may thus enable BGs 142 to transceive data traffic of the associated client devices 150 of BGs 142 with BGs 141 via HG 120a. In this manner, these first and second secondary summarized routes may enable transceiving data traffic between the first geographic region and the second geographic region.

Figure 3:
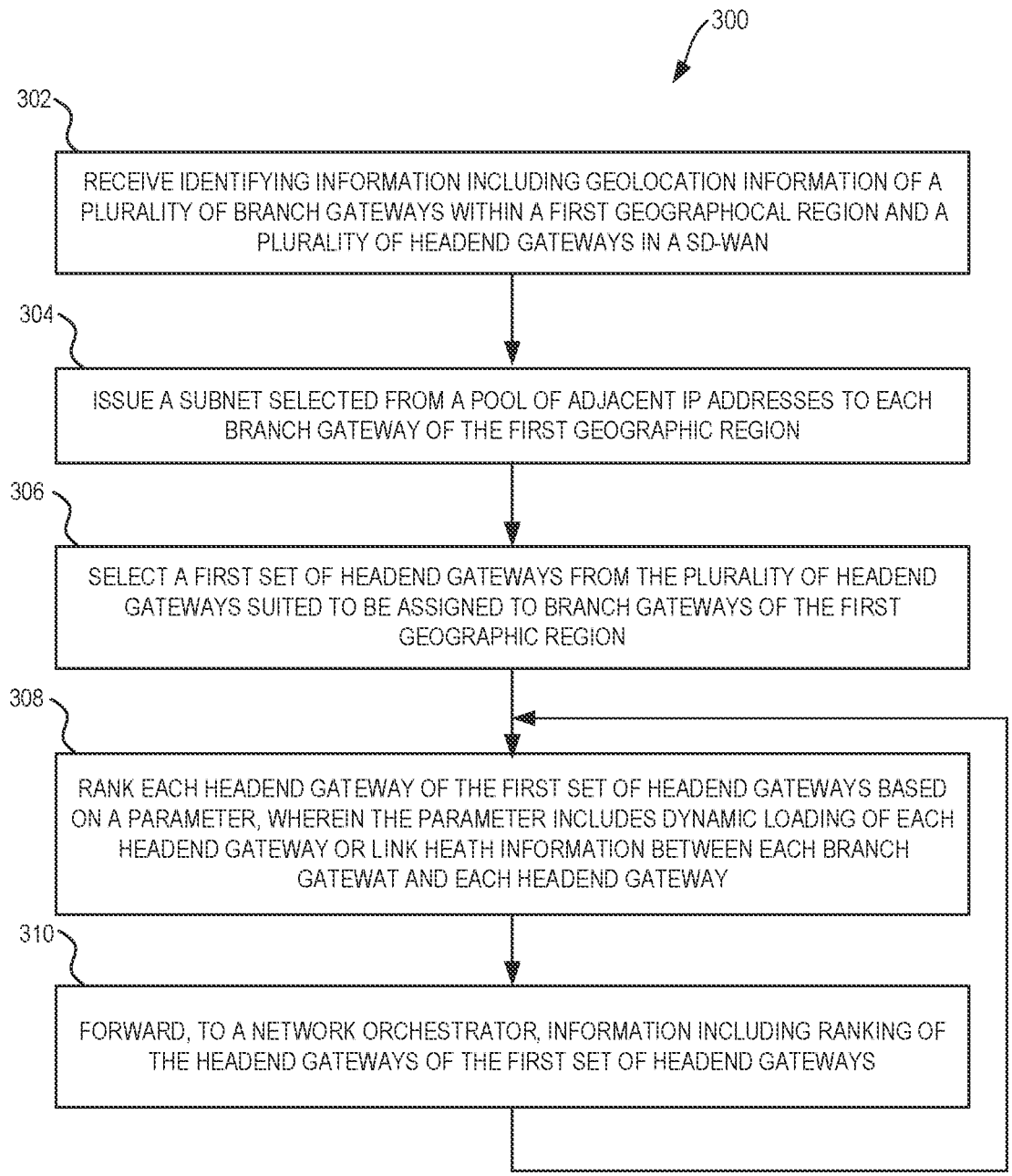
FIG. 3 is a flow chart illustrating a method for selecting a headend gateway to route subnets of branch gateways of a first geographic region, in accordance with one example.

FIG. 3 is a flowchart illustrating an example method 300 for HG selection to route subnets of BGs of a geographic region. Method 300 may, for example, be executed by a service provided from an analyzer (e.g., analyzer 110). For illustration purposes, the execution of example method 300 is described in conjunction with analyzer 110 of FIG. 1. Although the below description is described with reference to analyzer 110 of FIG. 1, other applications or devices suitable for the execution of method 300 may be utilized. Additionally, implementation of method 300 is not limited to such examples. Although the flowchart of FIG. 3 shows a specific order of performance of certain functionalities, method 300 is not limited to such order. For example, the functionalities shown in succession in the flowchart may be performed in a different order, may be executed concurrently or with partial concurrence, or a combination thereof.

At block 302, analyzer 110 may receive identifying information 145 of a plurality of BGs 140 and identifying information 125 of a plurality of HGs 120 of a SD-WAN 100. In an example, identifying information 145 of a BG 140 includes geolocation information of that BG and identifying information 125 of a HG 120 includes geolocation information of that HG. In some examples, analyzer 110 may identify BGs 141 located within a first geographic region based on the geolocation information received from BGs of the plurality of BGs 140.

At block 304, analyzer 110 may issue one or more subnets to each BG 141 of the first geographic region. In an example, analyzer 110 may select the subnets from a pool of contiguous IP addresses associated to the first geographic region and issue the subnet(s) to each BG 141.

At block 306, analyzer 110 may select a first set of HGs 121 from the plurality of HGs 120 that are suited to be assigned to BGs 141 of the first geographic region. Analyzer may select the first set of HGs 121 based on the geolocation information. In an example, each HG of the first set of HGs 121 is located within the first geographic region.

At block 308, analyzer 110 may rank each HG of the first set of HGs 121 based on a parameter including dynamic loading of each HG or link health information of each BG 141 and each HG 121.

At block 310, analyzer 110 may forward information 162 including the ranking of the first set of HGs 121 to a network orchestrator 135 of SD-WAN 100 to cause network orchestrator 135 to assign BGs 141 of the first geographic region to the highest ranking HG of the first set of HGs 121 to enable routing of the subnets of BGs 141 of the first geographic region to the selected HG 121.

Figure 4:
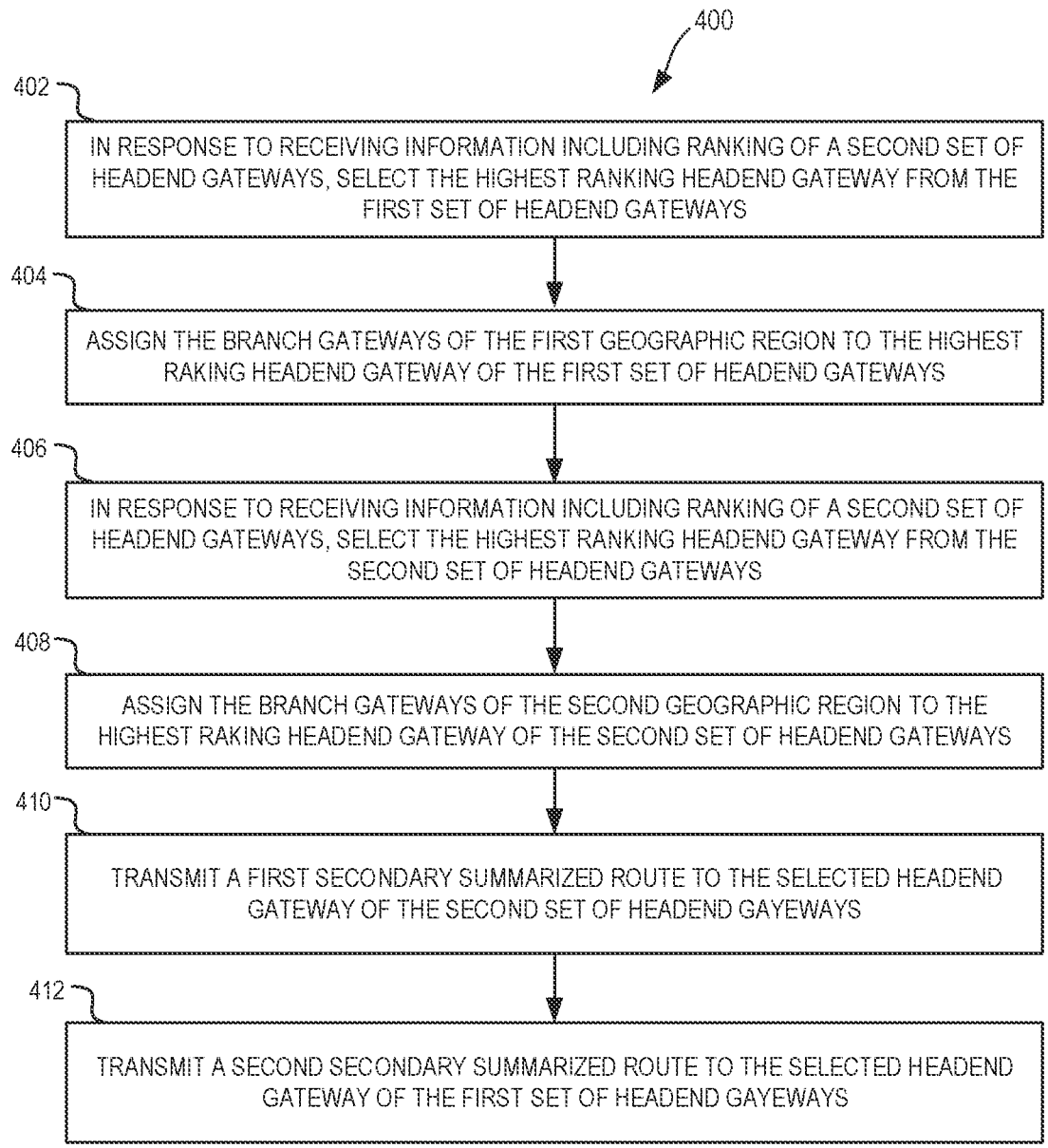
FIG. 4 is a flow chart illustrating a method for routing subnets of branch gateways of a first geographic region to branch gateways of a second geographic region, in accordance with one example.

FIG. 4 is a flowchart illustrating an example method 400 for routing of subnets of BGs of a first geographic region to BGs of a second geographic region. The method 400 may, for example, be executed by a service provided from a network orchestrator (e.g., network orchestrator 135). For illustration purposes, the execution of example method 400 is described in conjunction with network orchestrator 135 of FIGS. 1-2. Although the below description is described with reference to network orchestrator 135 of FIGS. 1-2, other applications or devices suitable for the execution of method 400 may be utilized. Additionally, implementation of method 400 is not limited to such examples. Method 400 may be performed in continuation of method 300 of FIG. 3. Although the flowchart of FIG. 4 shows a specific order of performance of certain functionalities, method 400 is not limited to such order. For example, the functionalities shown in succession in the flowchart may be performed in a different order, may be executed concurrently or with partial concurrence, or a combination thereof.

At block 402, in response to receiving information 164 including the ranking of the first set of HGs 121 from analyzer 110, network orchestrator 135 may select the highest ranking HG of the first set of HGs 121.

At block 404, network orchestrator 135 may assign BGs 141 of the first geographic region to the selected HG 121 (i.e., the highest ranking HG). In some examples, the selected HG 121 may transmit the first primary summarized route to a network infrastructure device (e.g., a router) of datacenter(s) 102 to route the subnets of BGs 141 of the first geographic region database(s) 102.

At block 406, network orchestrator 135 may select the highest ranking HG (e.g., HG 120f) from a second set of HGs 122 to be assigned to BGs 142 of a second geographic region in response to receiving information 164 including the ranking of the second set of HGs 122 from analyzer 110.

At block 408, network orchestrator 135 may assign BGs 142 of the second geographic region to the selected HG (i.e., the highest ranking HG) of the second set of HGs 122. In some examples, the selected HG 122 may transmit the second primary summarized route to another network infrastructure device (e.g., a router) of datacenter(s) 102 to route the subnets of BGs 142 of the second geographic region database(s) 102.

At block 410, network orchestrator 135 may transmit the first secondary summarized route to the selected HG of the second set of HGs 122 (e.g., HG 120f). The selected HG of the second set of HGs 122 may then use the first secondary summarized route to route the subnets of BGs 141 of the first geographic region to BGs 142 of the second geographic region.

At block 412, network orchestrator 135 may transmit the second secondary summarized route to the selected HG (e.g., 120a) of the first set of HGs 121. The selected HG of the first set of HGs 121 may then use second secondary summarized route to route the subnets of BGs 142 of the second geographic region to BGs 141 of the first geographic region.

Figure 5:
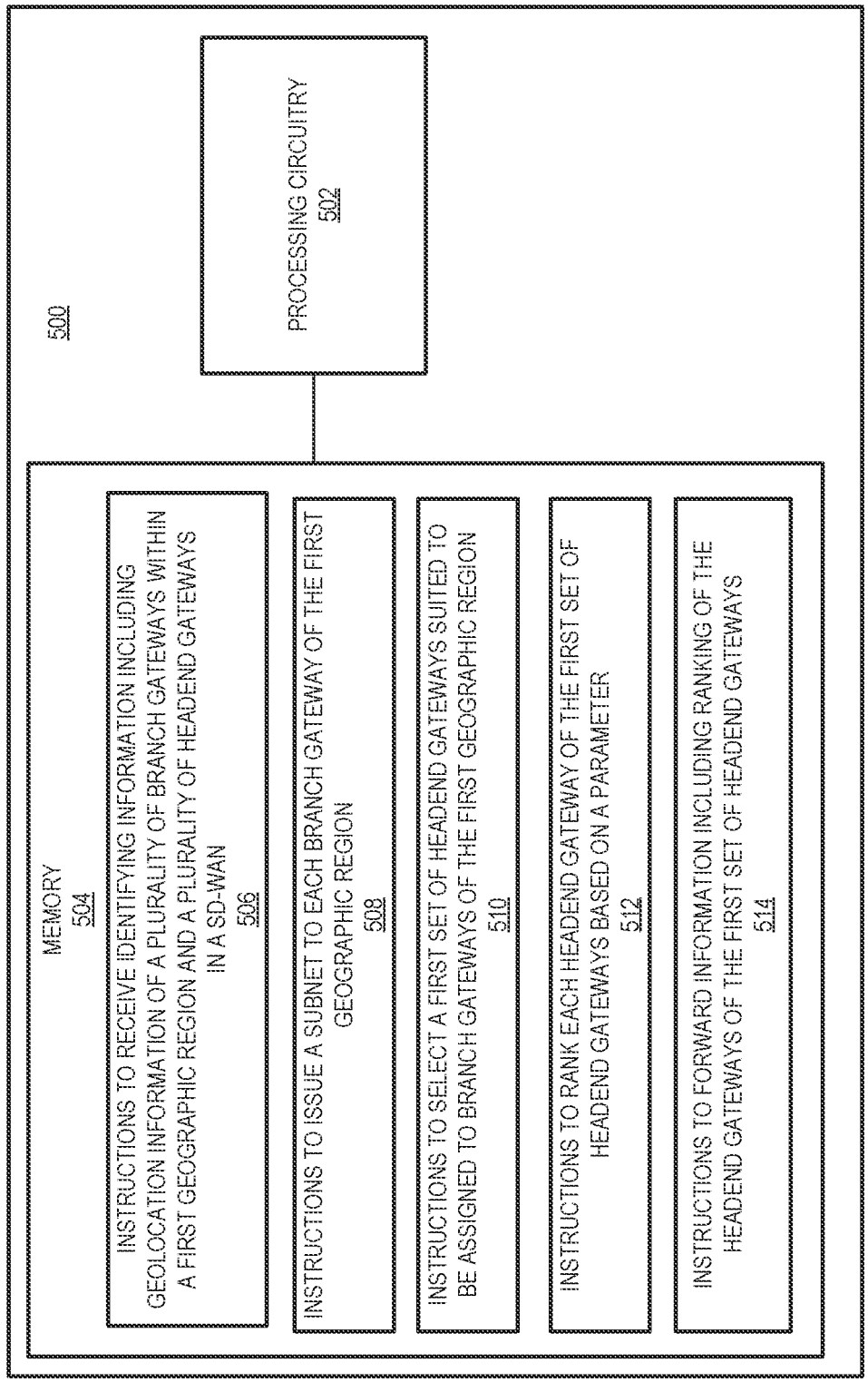
FIG. 5 is a block diagram depicting an analyzer including a processing circuitry and a computer-readable medium encoded with instructions to select a headend gateway to route subnets of branch gateways of a first geographic region, in accordance with an example.

FIG. 5 illustrates an analyzer 500 including a processing circuitry 502 and a memory 504 encoded with example instructions 506, 508, 510, 512, 514 (collectively 'instructions 506-514') to select a headend gateway to route subnets of branch gateways of a first geographic region in a SD-WAN. Although analyzer 500 is shown in FIG. 5 as a computing device, it is contemplated that an analyzer consistent with this disclosure could take many forms, including a cloud service, a network service, etc.

Instructions 506-514 may be executed on the processing circuitry 502 to cause the analyzer 500 to perform various actions. Also, although not shown in FIG. 5, memory 504 may include additional instructions to cause analyzer 500 to perform additional actions when those instructions are executed by processing circuitry 502.

Processing circuitry 502 is circuitry that receives instructions and data and executes the instructions. Processing circuitry 502 may include application specific integrated circuits (ASICs), field programmable gate arrays (FPGAs), microcontrollers, central processing units (CPUs), graphics processing units (GPUs), microprocessors, or any other appropriate circuitry capable of receiving instructions and data and executing the instructions. Processing circuitry 502 may include one processor or multiple processors. Processing circuitry 502 may include caches. Processing circuitry 502 may interface with other components of a device, including memory, network interfaces, peripheral devices, supporting circuitry, data buses, or any other appropriate component. Processors of processing circuitry 502 may communicate to one another through shared cache, inter-processor communication, or any other appropriate technology.

Memory 504 is one or more non-transitory computer-readable medium capable of storing instructions and data. Memory 504 may include random access memory (RAM), read only memory (ROM), processor cache, removable media (e.g., CD-ROM, USB Flash Drive), storage drives (e.g., hard drive (HDD), solid state drive (SSD)), network storage (e.g., network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

For ease of illustration, FIG. 5 is described with reference to FIG. 1. In certain examples, instructions 506-514 may be executed for performing the functionalities of analyzer 110 and one or more methods, such as, method 300 described below with respect to FIG. 3.

Instructions 506, when executed by processing circuitry 502 may cause processing circuitry 502, to receive identifying information 145 including geolocation information of BGs 141 within a first geographic region and a plurality of HGs 120 in a SD-WAN 100.

Instructions 508, when executed by processing circuitry 502, may cause processing circuitry 502 to issue a subnet to each of BGs 141 of the first geographic region. Each subnet is selected from a pool of contiguous IP addresses associated with the first geographic region.

Instructions 510, when executed by processing circuitry 502, may cause processing circuitry 502 to select a first set of HGs 121 from the plurality of HGs 120 that are suited to be assigned to BGs 141 of the first geographic region.

Instructions 512, when executed by processing circuitry 502, may cause processing circuitry 502 to rank each HG of the first set of HGs 121 based on a parameter including dynamic loading of each HG 121 or link health information of each BG 141 and each HG 121.

Instructions 514, when executed by processing circuitry 502, may cause processing circuitry 502 to forward, to a network orchestrator 135, information 164 including the ranking of each HG of the first set of HGs 121.

A network administrator is a person, network service, or combination thereof that has administrative access to network infrastructure devices and configures devices to conform to a network topology.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g., CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context. Further, phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A method, comprising:

receiving, by an analyzer, identifying information comprising geolocation information of a plurality of branch gateways within a first geographic region and a plurality of headend gateways in a software defined wide area network (SD-WAN);

issuing, by the analyzer, a subnet to each branch gateway of the first geographic region, wherein the subnets issued to the branch gateways of the first geographic region are selected from a pool of contiguous IP addresses associated with the first geographic region;

selecting, by the analyzer and based on the geolocation information of each of the plurality of the headend gateways, a first set of headend gateways from the plurality of headend gateways suited to be assigned to the branch gateways of the first geographic region;

ranking, by the analyzer, each headend gateway of the first set of headend gateways based on a parameter, wherein the parameter comprises dynamic loading of each headend gateway or link health information between each headend gateway and each branch gateway of the first geographic region; and forwarding, by the analyzer to a network orchestrator, information comprising the ranking of each headend gateway of the first set of headend gateways to cause the network orchestrator to assign the branch gateways of the first geographic region to the highest ranking headend gateway based on the information comprising the ranking of the first set of headend gateways to enable routing of the subnets of the branch gateways of the first geographic region to the highest ranking gateway.

2. The method of claim 1, wherein the identifying information from each of the plurality of branch gateways and each of the plurality of headend gateways comprises at least one of a public Internet Protocol (IP) address and a media access control (MAC) address.

3. The method of claim 1, wherein each headend gateway of the first set of headend gateways is ranked based on the parameter comprising the dynamic loading of each headend gateway and the link health information between each headend gateway and each branch gateway of the first geographic region.

4. The method of claim 1, further comprising:

dynamically determining, by the analyzer, the parameter comprising the dynamic loading of each headend gateway or the link health information between each headend gateway and each branch gateway of the first geographic region; and dynamically ranking, by the analyzer, each headend gateway of the first set of headend gateways based on the parameter.

5. The method of claim 1, further comprising:

dynamically issuing, by the analyzer, a subnet to each branch gateway of the first geographic region in response to receiving a notification that a new branch gateway has joined the SD-WAN within the first geographic region; and dynamically ranking, by the analyzer, each headend gateway of the first set of headend gateways based on the parameter.

6. The method of claim 1, further comprising:

dynamically selecting, by the analyzer, the first set of headend gateways from the plurality of headend gateways suited to be assigned to the branch gateways of the first geographic region in response to receiving a notification that a new headend gateway has joined the SD-WAN, wherein the new headend gateway is suited to be assigned to the branch gateways of the first geographic region; and dynamically ranking, by the analyzer, each headend gateway of the first set of headend gateways based on the parameter.

7. The method of claim 1, further comprising:

selecting, by the network orchestrator, the highest ranking headend gateway from the first set of headend gateways in response to receiving the information comprising the ranking of each headend gateway of the first set of headend gateways from the analyzer; and assigning, by the network orchestrator, the branch gateways of the first geographic region to the highest ranking headend gateway of the first set of headend gateways.

8. The method of claim 1, further comprising:

selecting, by the network orchestrator, the highest ranking headend gateway from a second set of headend gateways in response to receiving information comprising ranking of each headend gateway of the second set of headend gateways suited to be assigned to the branch gateways of a second geographic region; and assigning, by the network orchestrator, the branch gateways of the second geographic region to the highest ranking headend gateway of the second set of headend gateways.

9. The method of claim 8, further comprising:

transmitting, by the network orchestrator, a first secondary summarized route to route the subnets of the branch gateways of the first geographic region to the highest ranking headend gateway of the second set.

10. The method of claim 9, further comprising:

transmitting, by the network orchestrator, a second secondary summarized route to route the subnets of the branch gateways of the second geographic region to the highest ranking headend gateway of the first set.

11. An analyzer of a software defined wide area network (SD-WAN), comprising:

a processing circuitry; and a memory comprising instructions that, when executed by the processing circuitry, cause the analyzer to:

receive identifying information, comprising geolocation information, of a plurality of branch gateways within a first geographic region and a plurality of headend gateways in the SD-WAN;

issue a subnet to each branch gateway of the first geographic region, wherein the subnets issued to the branch gateways of the first geographic region are selected from a pool of contiguous IP addresses associated with the first geographic region;

select, based on the geolocation information of each of the plurality of the headend gateways, a first set of headend gateways from the plurality of headend gateways suited to be assigned to the branch gateways of the first geographic region;

rank each headend gateway of the first set of headend gateways based on a parameter, wherein the parameter comprises dynamic loading of each headend gateway or link health information between each headend gateway and each branch gateway of the first geographic region; and forward information comprising the ranking of each headend gateway of the first set of headend gateways to cause a network orchestrator to assign the branch gateways of the first geographic region to the highest ranking headend gateway based on the information comprising the ranking of the first set of headend gateways to enable routing of the subnets of the branch gateways of the first geographic region to the highest ranking gateway.

12. The analyzer of claim 11, wherein each headend gateway of the first set of headend gateways is ranked based on the parameters comprising the dynamic loading of each headend gateway and the link health information between each headend gateway and each branch gateway of the first geographic region.

13. The analyzer of claim 11, wherein the identifying information from each of the plurality of branch gateways and each of the plurality of headend gateways comprises at least one of a public Internet Protocol (IP) address and a media access control (MAC) address.

14. The analyzer of claim 11, wherein the instructions further cause the analyzer to:

dynamically determine the parameter comprising the dynamic loading of each headend gateway or the link health information between each headend gateway and each branch gateway of the first geographic region of each headend gateway of the first set of headend gateways; and dynamically rank each headend gateway of the first set of headend gateways based on the parameter.

15. The analyzer of claim 11, wherein the instructions further cause the analyzer to:

dynamically issue a subnet to each branch gateway of the first geographic region in response to receiving a notification that a new branch gateway has joined the SD-WAN within the first geographic region; and dynamically rank each headend gateway of the first set of headend gateways based on the parameter.

16. The analyzer of claim 11, wherein the instructions further cause the analyzer to:

dynamically select the first set of headend gateways from the plurality of headend gateways suited to be assigned to the branch gateways of the first geographic region in response to receiving a notification that a new headend gateway has joined the SD-WAN, wherein the new headend gateway is suited to be assigned to the branch gateways of the first geographic region; and dynamically rank each headend gateway of the first set of headend gateways based on the parameter.

17. A non-transitory computer-readable medium storing instructions executable by a processing circuitry, the instructions comprising:

instructions to receive identifying information, comprising geolocation information, of a plurality of branch gateways within a first geographic region and a plurality of headend gateways in a software defined wide area network (SD-WAN);

instructions to issue a subnet to each branch gateway of the first geographic region, wherein the subnets issued to the branch gateways of the first geographic region are selected from a pool of contiguous IP addresses associated with the first geographic region;

instructions to select, based on the geolocation information of each of the plurality of the headend gateways, a first set of headend gateways from the plurality of headend gateways suited to assign the branch gateways of the first geographic region to; and instructions to rank each headend gateway of the first set of headend gateways based on a parameter, wherein the parameter comprises dynamic loading of each headend gateway or link health information between each headend gateway and each branch gateway of the first geographic region; and instructions to forward information comprising the ranking of each headend gateway of the first set of headend gateways to cause a network orchestrator to assign the branch gateways of the first geographic region to the highest ranking headend gateway based on the information comprising the ranking of the first set of headend gateways to enable routing of the subnets of the branch gateways of the first geographic region to the highest ranking gateway.

18. The non-transitory, computer-readable medium of claim 17, wherein each headend gateway of the first set of headend gateways is ranked based on the parameter comprising the dynamic loading of each headend gateway and the link health information between each headend gateway and each branch gateway of the first geographic region.

* * * * *